United States Patent [19]

Alkofer

[11] Patent Number: 4,731,671
[45] Date of Patent: * Mar. 15, 1988

[54] CONTRAST ADJUSTMENT IN DIGITAL IMAGE PROCESSING METHOD EMPLOYING HISTOGRAM NORMALIZATION

[75] Inventor: James S. Alkofer, Hamlin, N.Y.

[73] Assignee: Eastman Kodak Company, Rochester, N.Y.

[*] Notice: The portion of the term of this patent subsequent to Mar. 1, 2005 has been disclaimed.

[21] Appl. No.: 730,629

[22] Filed: May 6, 1985

[51] Int. Cl.[4] .................. H04N 1/40; H04N 1/46; G03F 3/08; G03B 27/80

[52] U.S. Cl. ................................... 358/284; 358/75; 358/80; 358/280; 355/38

[58] Field of Search ................... 358/75, 76, 78, 80, 358/280, 283, 284, 256; 382/18; 355/38, 35, 40, 41, 77, 88, 68

[56] References Cited

U.S. PATENT DOCUMENTS

| | | | |
|---|---|---|---|
| 4,410,909 | 10/1983 | Ueda et al. | 358/78 |
| 4,416,539 | 11/1983 | Terashita | 355/38 |
| 4,467,364 | 8/1984 | Konagaya | 358/76 |
| 4,472,736 | 9/1984 | Ushio et al. | 358/75 |
| 4,654,722 | 3/1987 | Alkofer | 358/284 |
| 4,667,228 | 5/1987 | Kawamura et al. | 358/80 |

FOREIGN PATENT DOCUMENTS

| | | | |
|---|---|---|---|
| 28131 | 2/1979 | Japan | 355/38 |
| 297976 | 3/1971 | U.S.S.R. | |

OTHER PUBLICATIONS

Miyake, Yoichi, "Tone Correction of Color Picture by Histogram Modification", *Nippon Shashin Sakhaishi*, vol. 48(2), pp. 94–101, 1980, with English Translation.

"A New Approach to Programming in Photomechanical Reproduction," Yu. Ovchinnikov et al., W. Banks IPC Science and Technology Press, Guildford, England, 1974, pp. 160–163.

*Primary Examiner*—James J. Groody
*Assistant Examiner*—Randall S. Svihla
*Attorney, Agent, or Firm*—Thomas H. Close

[57] ABSTRACT

A problem in digital image processing employing a tone reproduction function that maximizes the quality of the processed image is to automatically determine the overall contrast of the processed image. In an improved method for determining the contrast of the processed image, the contrast is automatically determined as a function of the standard deviation of a sample of tone values used to generate the tone reproduction function by normalizing a histogram of the sample of tone values. The sample of tone values is selected from one of a plurality of samples of tone values corresponding to a plurality of contrast intervals based upon the shape of the histogram of the selected sample of tone values. To facilitate the adjustment of contrast, the tone reproduction function is constructed to produce values in units of a standard normal variate Z. These Z values are then multiplied by a constant which is a function of the standard deviation of the sample of tone values to determine the contrast of the processed image. A constant representing the mean density of the output medium is added to the multiplied Z values to position the tone scale of the processed image with respect to the tonal range of the output medium.

15 Claims, 11 Drawing Figures

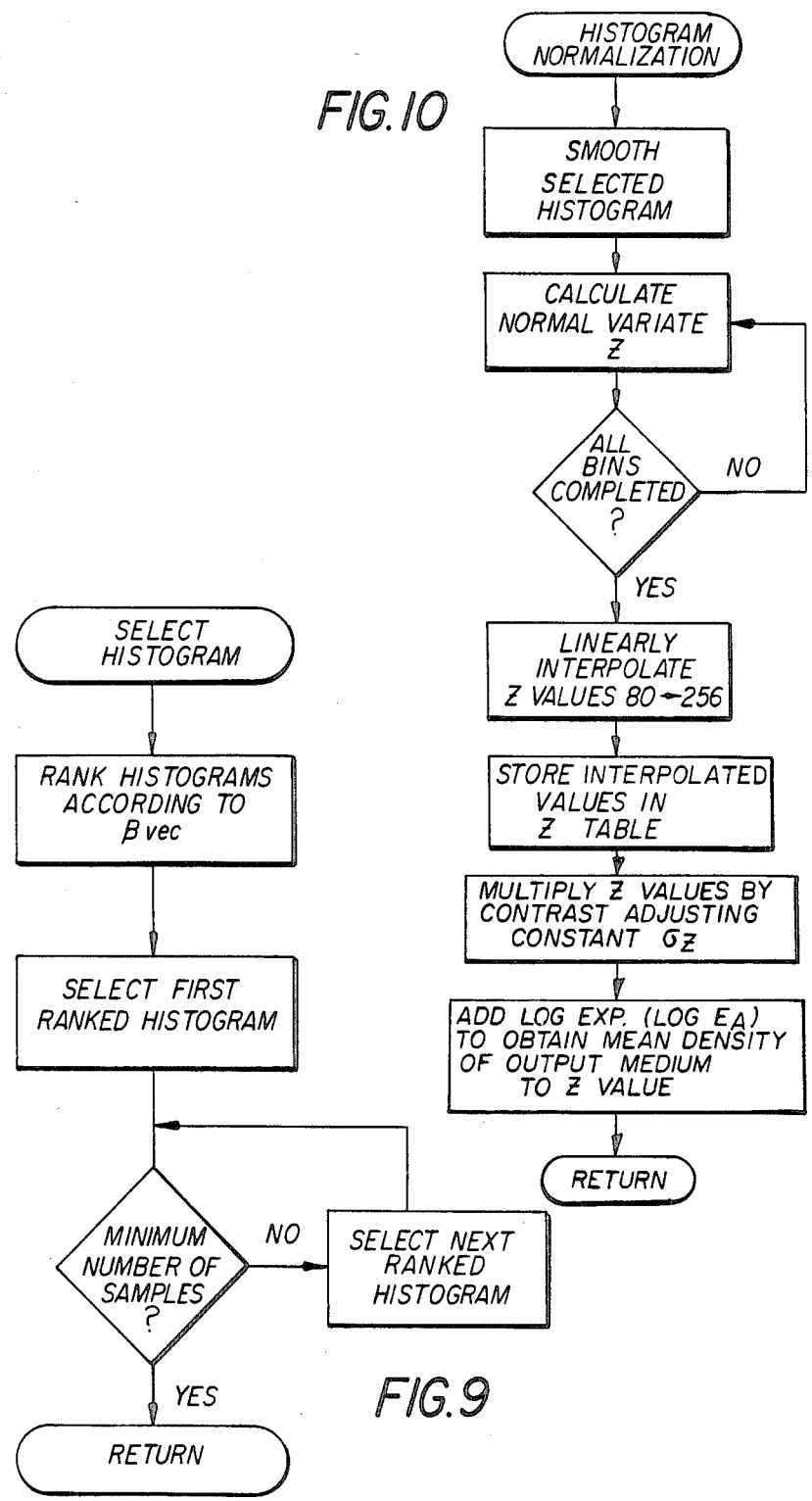

CONTRAST ADJUSTMENT IN DIGITAL IMAGE PROCESSING METHOD EMPLOYING HISTOGRAM NORMALIZATION

TECHNICAL FIELD

The invention relates to digital image processing wherein a tone reproduction function is automatically generated by normalizing the histogram of a sample of tone values from the informational portion of the image and more particularly to a method for automatically determining the contrast of the processed image.

BACKGROUND ART

In the field of digital image processing, an original image, such as a photographic negative, is sampled periodically to produce a digital representation of the original image. The digital image is processed by applying image processing functions to improve such image qualities as sharpness and tone scale. The processed digital image is then displayed on output media such as a CRT or photographic film or paper.

FIG. 2 is a schematic diagram of representative image reproduction apparatus employing digital image processing. Such apparatus includes an input device 10 for sampling the original image and an analog-to-digital converter 12 for producing the digital representation of the original image. Commonly employed input devices include drum and flat bed scanners, linear and area solid state image sensing arrays, and CRT and laser flying spot scanners.

The digital image is stored in a mass memory 14, such as a solid state frame buffer, magnetic tape or disc storage device. A digital computer 16 applies the various image processing functions to the digital image to produce the processed digital image.

The digital computer 16 may comprise, for example, a main frame general purpose digital computer, or for higher speed operation, a digital computer specially configured for high speed digital processing of images.

The processed digital image is converted to sampled analog form by a digital-to-analog converter 18 and is displayed on an output device 20 such as a drum or flat bed graphic arts scanner, or a CRT or laser flying spot scanner. The elements of the image reproduction apparatus communicate via a data and control bus 22. As noted above, one of the processing functions performed by the digital computer is to adjust the tone scale and contrast of the processed image. There is a continuing effort in the field of digital image processing to automatically determine the optimum tone reproduction function and overall contrast adjustment employed by the digital computer.

The basic method of tone reproduction in digital image processing is shown graphically in FIG. 3. As shown in the upper left quadrant of the graph in FIG. 3, each input signal level (measured by the input device 10 in FIG. 1) is translated to an input tone value by an input calibration function, represented by the curve labeled 24. Each input tone value is converted to an output tone value by the tone reproduction function shown as the curve labeled 26 in the upper right quadrant of the graph. Finally, each output tone value is converted to an output device level by an output device calibration function shown by the curve labeled 28 in the lower right quadrant of the graph.

The input and output calibration functions are determined by the physical characteristics of the input and output devices and the input and output media. The optimum tone reproduction function, on the other hand, depends upon the tonal characteristics of the original image, and preferably is custom tailored for each image that is reproduced.

In the past, empirical rules for generating the tone reproduction function were derived by making a large number of reproductions using a variety of tone reproduction functions, and having a panel of observers pick the most pleasing reproduction. The selection was then correlated with the tone reproduction functions used to generate the images. Data for generating the tone reproduction function was obtained by measuring the tones in a gray scale that was recorded along with the original scene.

To automate the process of generating a tone reproduction function, it was desirable to eliminate the recorded gray scale in the original image and to seek the data needed to generate the tone reproduction function in the statistical properties of the tonal content of the original image itself.

This effort led some investigators to hypothesize that the highly modulated (busy) parts of a high quality image follow a normal (Gaussian) frequency distribution with respect to tone values. See for example U.S.S.R. Invention's Certificate No. 297976 (1971) entitled "Process for the Evaluation of the Image Quality" by Ovchinnikov et al. Ovchinnikov and his coworkers went on to demonstrate that the appearance of digitally processed photographic images could be improved by using a tone reproduction function that is generated by normalizing the distribution of a statistical sample of tone values (a lightness scale was employed) taken from parts of the image where the first derivative of lightness with respect to distance in the image was greater than some predetermined minimum threshold. See the article entitled "A New Approach to Programming in Photomechanical Reproduction" by Yu. Ovchinnikov et al. The 12th IARIGAI Conference Proc., Versailles, France, Ed. W. Banks IPC Science and Technology Press, Guildford, England 1974, pp. 160–163.

Briefly, the method of Ovchinnikov et al. involves scanning the original image and randomly sampling the tone values (lightness) occuring in parts of the image where the first derivative of lightness is above some predetermined minimum threshold value. These sampled tone values are compiled in a histogram, illustrated by the curve labeled 30 in the lower right quadrant of FIG. 4. A normal distribution is shown as the curve labeled 32 in the upper left quadrant of FIG. 4. The method for generating the tone reproduction function involves constructing a function that transforms the sampled tone distribution into the normal distribution. The optimum tone reproduction function for the whole image is then taken as that function. This tone reproduction function is shown as the curve labeled 34 in the upper right hand quadrant of FIG. 4. In this prior art method, the tone reproduction function relates each lightness value in the input to an output lightness value.

After the tone reproduction function is generated, it is applied to each tone value of the digital image to produce the processed digital image. The article by Ovchinnikov et al. does not discuss the particular lightness scale that was employed to express tone values in the tone reproduction function, nor does it disclose a method for determining the overall contrast of the processed image. The contrast of the processed image is determined by appropriately scaling the processed tone values. If an appropriate scaling is chosen that produces pleasing result for an average image, then the processed image of a scene that was illuminated by very flat lighting (skylight for example) will appear contrasty. On the other hand, processed images of scenes with an exceptionally long tone scales will appear too flat. If the contrast of the processed image must be adjusted by an operator making subjective judgements about the original images, this prevents the use of the digital processing method in fully automated photographic printing apparatus. This represents a shortcoming of the method.

It is therefore an object of the present invention to provide a method of automatically adjusting the overall contrast in a digital image processing method of the type employing a tone reproduction function generated by normalizing a sample of tone values from the informational portion of the image.

DISCLOSURE OF THE INVENTION

The object of the invention is achieved by determining the overall contrast of the image as a function of the standard deviation of the sample of tone values used to generate the tone reproduction functions.

In a preferred implementation of the invention, the tone reproduction function is generated so as to relate input tone values to values of a standard normal variate Z. The term standard normal variate as used herein refers to a value on a scale in units of standard deviations of a normal (Gaussian) distribution having a standard deviation of one and a mean of zero. The values of the digital image after being processed by the tone reproduction function are dimensionless quantities representing a number of standard deviations. The Z values are given dimensions by multiplying them by a constant function $\sigma_z$ of the standard deviation of the sample of tone values as follows;

$$\sigma_z = m \cdot o_s + b$$

where $\sigma_s$ is the standard deviation of the sample of tone values and m and b are system-dependent constants.

Finally, a constant representing the mean tone value of the output medium is added to the multiplied Z values to position the tone scale of the processed image with respect to the tonal range of the output medium.

BRIEF DESCRIPTION OF THE DRAWINGS

The inventions are described with reference to the drawings, wherein:

FIGS. 7-10 are flow charts illustrating the method of generating a tone reproduction function and adjusting contrast according to the invention.

MODES OF CARRYING OUT THE INVENTIONS

Before describing the steps of the digital image processing method according to the present invention, some theoretical motivation for the invention will be discussed.

The use of a tone reproduction function that produces values of the standard normal variate Z has several advantages. First, the Z scale is essentially linear with density and can be regarded as a relative log printing exposure. As previously noted, an image that has been translated by such a tone reproduction function has no physical dimensions (i.e. the image is expressed in terms of standard deviations). In this form, the contrast of the image is readily adjusted by multiplying the Z values with a constant. The image can then be fit to a given output medium by adding a constant representing the mean density (or other corresponding physical quantity of the output medium) to the processed values.

The correct value for the multiplicative constant for adjusting contrast will depend upon the intrinsic contrast of the original scene. A quantity that varies as a function of the contrast of the original scene is the standard deviation of the tone values in the scene. If the scene was illuminated with very flat lighting, the standard deviation will be very small. On the other hand, a scene having a very long tone scale will have a large standard deviation. Therefore, the contrast of the processed image can be adjusted by a suitable function of the standard deviation of the tone values in the image. The standard deviation of the tone values in the sample selected for generating the tone reproduction function is an appropriate and conveniently available value in the digital image processing method.

Figure 1:
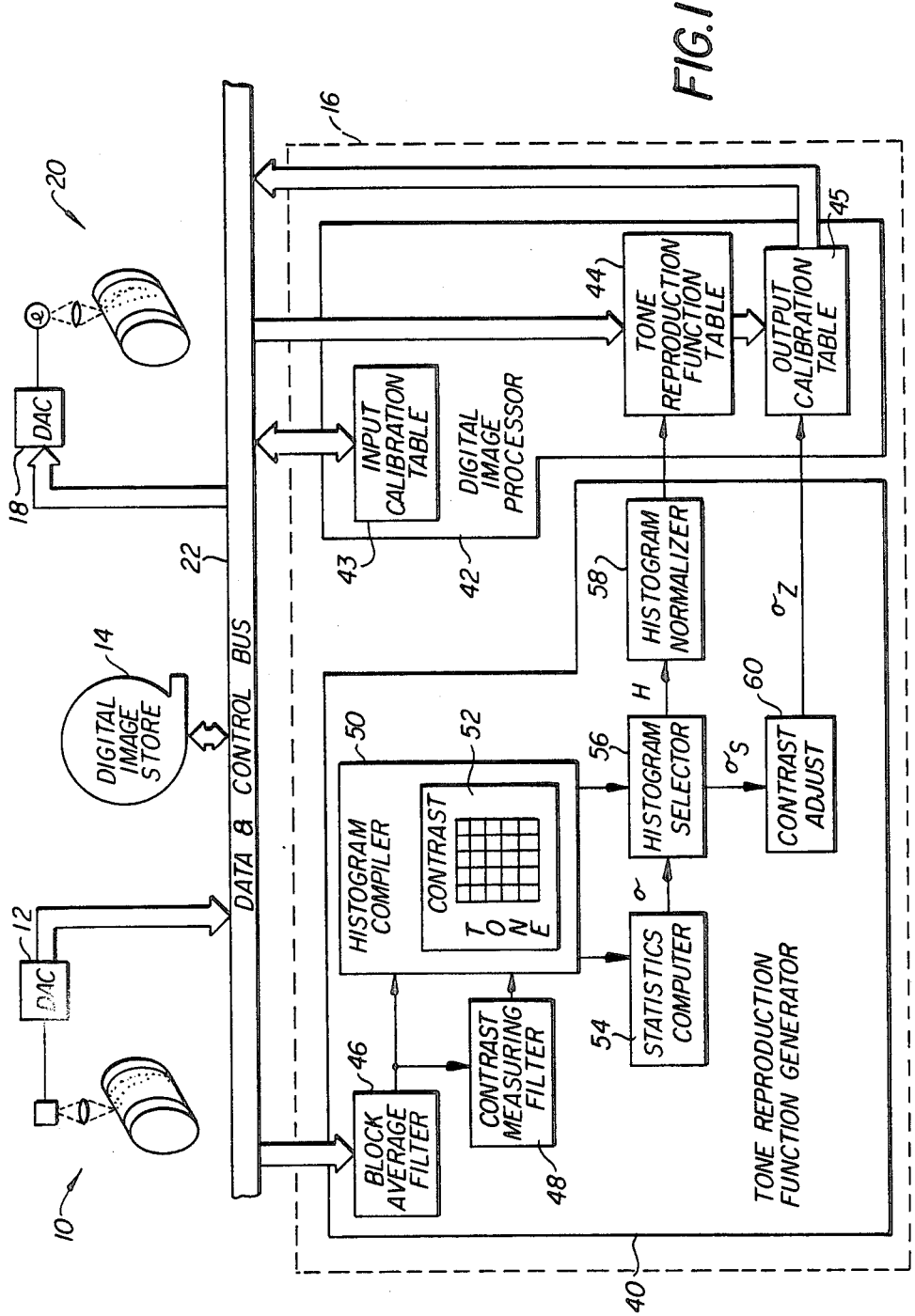
FIG. 1 is a schematic diagram illustrating apparatus for carrying out the digital image processing method according to the present invention.
Figure 2:
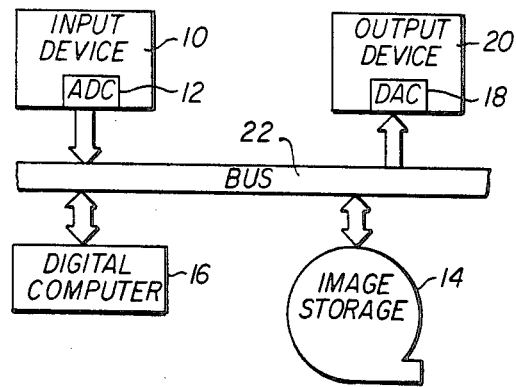
FIG. 2 is a schematic diagram of generic prior art image reproduction apparatus for practicing digital image processing.
Figure 3:
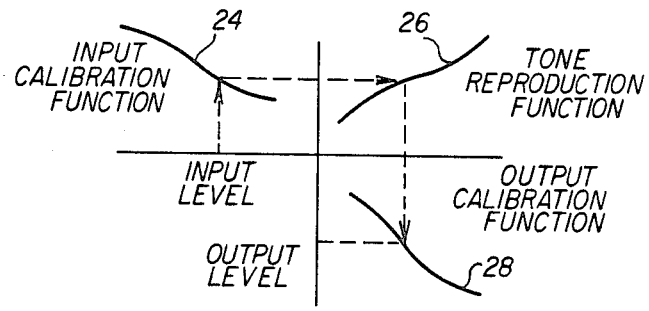
FIG. 3 is a graph illustrating the prior art method of tone reproduction in digital image processing employing a tone reproduction function.
Figure 4:
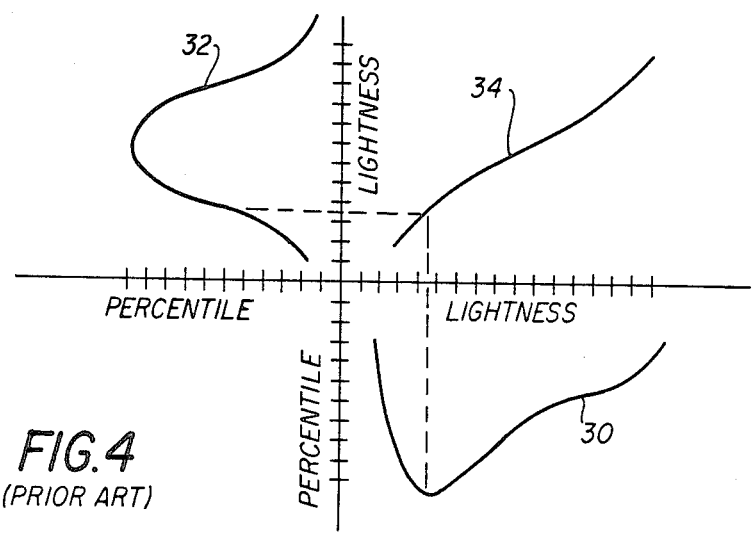
FIG. 4 is a graph illustrating the prior art method of generating the tone reproduction function by normalizing a sample of tone values.

Turning now to FIG. 1, an example of apparatus used to practice the present invention will be described. Elements similar to those in FIG. 2 are similarly numbered. The input device 10 is a graphic arts scanner, shown as a drum-type scanner. A scanning spot size of 12 $\mu$m sampled on approximately 8 $\mu$m centers was employed to scan photographic negatives as the original input image. The signal produced by this scanner is supplied to an analog-to-digital converter 12 that produces an 8-bit output code representing one of 256 possible signal levels for each sample point. The sampled signal levels are transformed to photographic density units by a digital computer 16 and are then stored on a magnetic tape storage device 14.

The digital image is processed by the digital computer 16. A DEC 2060 mainframe computer was used. The processed digital images are converted from digital-to-analog form by a digital-to-analog converter 18. The processed image is reproduced on an output scanning device 20, shown as a graphic arts drum-type scanner having a light source that is modulated by the sampled analog signal. The transfer of digital image signals and control signals between the elements of the apparatus is handled by a data and control bus 22. The digital computer 16 is programmed to provide a tone reproduction function generator 40 and a digital image processor 42. The tone reproduction function generator 40 receives the digital image from the digital image storage device 14 and generates a tone reproduction function. The tone reproduction function is supplied to a tone reproduction function table 44 in the digital image processor 42. The tone reproduction function generator 40 also produces the multiplicative constant $\sigma_z$ for adjusting contrast according to the present invention. The multiplicative constant $\sigma_z$ is factored into an output calibration table 45 in digital image processor 42. The digital image processor 42 also includes an input calibration table 43 that transforms the scanner signal levels to photographic density units.

Figure 5:
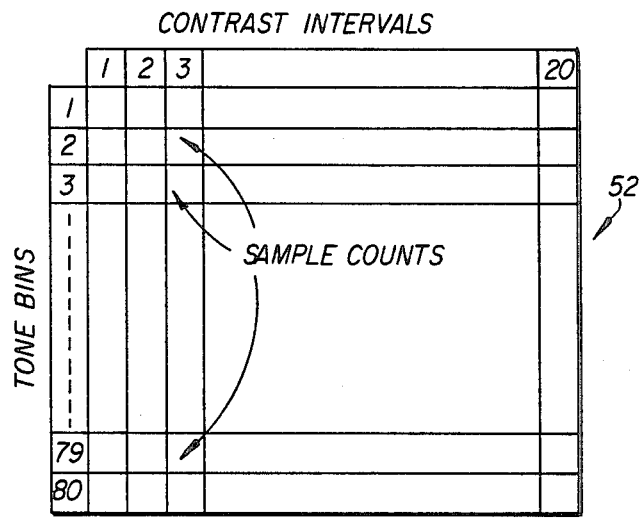
FIG. 5 illustrates the arrangement of the histogram memory employed to compile the histogram of tone values.

The tone reproduction function generator 40 includes a filter 46 for performing a block average on the digital image, and a filter 48 for measuring the contrast of the image around each block averaged tone value. A histogram compiler 50 compiles the block averaged tone values into a plurality of histograms from a plurality of contrast intervals in a histogram memory 52. FIG. 5 shows, in a graphic way, the organization of the histogram memory 52. There are twenty contrast intervals having a width of 0.04 log contrast units each. The width of the contrast intervals was arbitrarily chosen to be approximately twice the minimum visual log contrast threshold. The width of the contrast intervals represents a tradeoff between randomness of sampling (the narrower the interval, the greater the randomness) and achieving a statistically significant sample (the wider the interval, the greater the number of samples). The 256 tone values are divided into 80 tone bins, for a resolution of 0.05 density units per tone bin.

Figure 6:
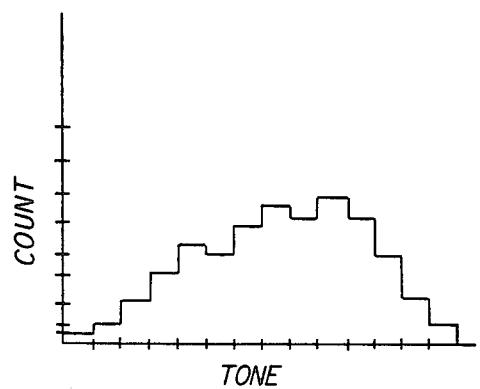
FIG. 6 is a graph illustrating a tone value histogram from one of the contrast intervals shown in FIG. 5.

Counts are accumulated in the appropriate tone bins in the histogram memory until all of the tone values in the digital image have been counted. FIG. 6 shows a graphic example of one of the tone value histograms from one of the contrast intervals.

Returning to FIG. 1, a statistics computer 54 in the tone reproduction function generator 40 computes the statistical parameters $\sigma$ of the histograms of tone values in the contrast intervals in the histogram memory 52.

A histogram selector 56 selectes a histogram from one of the contrast intervals on the basis of predetermined statistical criteria relating to the histogram of tone values in the interval, and supplies the selected histogram H to a histogram normalizer 58. This method of selecting the tone value sample for normalization is the subject of copending U.S. patent application No. 730,630, now U.S. Pat. No. 4,654,722. The histogram normalizer 58 normalizes the selected histogram to generate the tone reproduction function used to compile a tone reproduction function lookup table 44 that is used by the digital image processor 42.

A contrast adjustment computer 60 receives the standard deviation $\sigma_s$ of the tone values in the selected contrast interval and generates the multiplicative constant $\sigma_z$ used to determine the contrast of the processed image. The multiplicative constant is factored into output calibration table 45.

The tone reproduction function lookup table 44 relates each of the 256 possible input tone values to one of 256 possible output Z values. After the tone reproduction function lookup table 44 has been generated, the digital image processor 42 processes the digital image by applying the tone reproduction function to each tone value in the image to produce a processed digital image. The output device calibration function is then applied to the processed digital image. The processed digital image is converted to analog form by digital-to-analog converter 18. The processed analog signal is then applied to the output scanning device 20 to reproduce the image.

The method of generating the tone reproduction function and the contrast control signal will now be described in more detail with reference to the flow charts of FIGS. 7–10.

Figure 7:
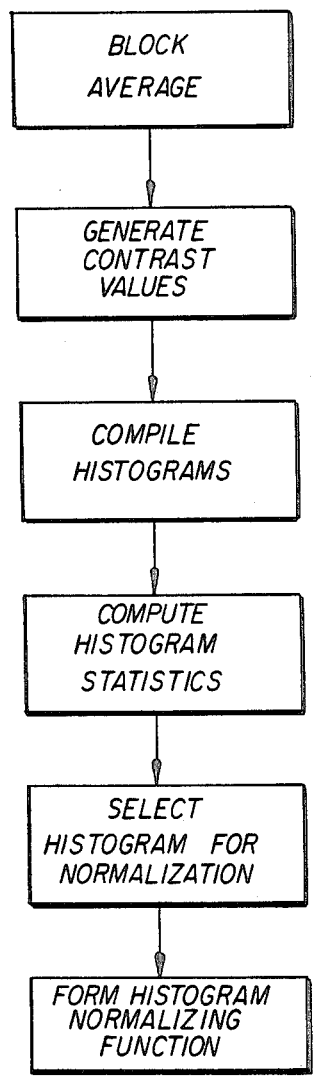

Referring first to the flow chart of FIG. 7, the steps performed on the digital image to generate the tone reproduction function include forming a block average of the digital image. This is accomplished by applying digital filter to the digital image tone values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} /16 \tag{1}$$

which means that the tone values of the image are averaged in nonoverlapping blocks of sixteen. This step is performed by the block average filter 46 in FIG. 1. Block averaging is performed to remove the effects of film grain on the tone value statistics and reduces the noise by a factor of 4.

Next, a digital filter representing a Laplacian operator of the form:

$$\begin{bmatrix} 0 & -1 & 0 \\ -1 & 4 & -1 \\ 0 & -1 & 0 \end{bmatrix} \tag{2}$$

is applied to the block averaged digital image to measure the contrast of the image at each block averaged tone value. This step is performed by the contrast measuring filter 48 in FIG. 1. The Laplacian operator has no response to uniform areas or linear gradients, and responds only to changes in gradients. The Laplacian operator works well in measuring the contrast of the image, however it is to be understood that other contrast measuring filters (e.g. gradient filters) may be employed with the present invention to measure the contrast of the image.

The histograms are compiled (by histogram compiler 50 in FIG. 1) as discussed above, their statistics computed (by statistics computer 54 in FIG. 1), a histogram is selected for normalization (by histogram selector 56 in FIG. 1) and the selected histogram is normalized (by histogram normalizer 58 in FIG. 1) to generate the tone reproduction function.

Figure 8:
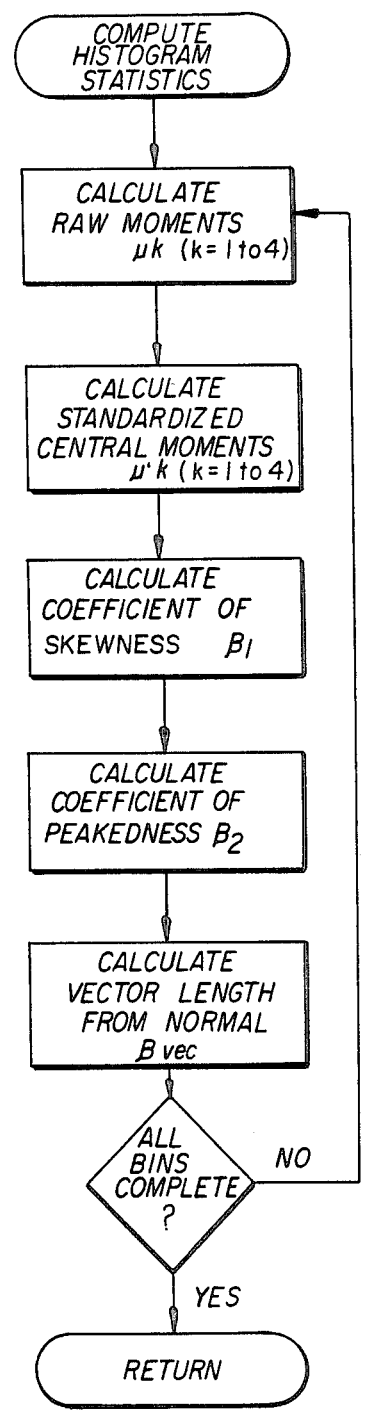

FIG. 8 is a flow chart showing the steps involved in compiling the histogram statistics. The raw moments $\mu_k$ taken about the mean, are computed as follows:

$$\mu_k = \frac{1}{N} \left( \sum_{i=1}^{N} (x_i - \bar{x})^k \right) \tag{3}$$

where
  N is total number of samples;
  $x_i$ is a tone value; and
  $\bar{x}$ is the mean tone value.

The standardized central moments $\mu'_k$ are calculated as follows:

$$\mu'_k = \frac{\mu_k}{\sigma^k}, \text{ where } \sigma = \sqrt{\mu^2} \quad (4)$$

The coefficient of symmetry (skewness) for each distribution is then represented as $$\beta_1 = (\mu'_3)^2 \quad (5)$$

and the coefficient of peakedness (kurtosis plus 3) is represented as $$\beta_2 = \mu'_4 \quad (6)$$

The vector length in the $\beta_1, \beta_2$ plane from the normal or Gaussian distribution of each histogram is then assigned a value $\beta_{vec}$ calculated as follows:

$$\beta_{vec} = \sqrt{\beta_1^2 + (\beta_2 - 3)^2} \quad (7)$$

Referring now to FIG. 9, the steps involved in selecting the histogram for normalization will be discussed. When the statistics for all of the histograms have been computed, the histograms are ranked according to their vector distance $\beta_{vec}$ from a normal distribution. The histogram having the lowest value of $\beta_{vec}$ is ranked first, and the histogram having the highest value is ranked last. The histogram chosen for normalization is the one ranked first. Other criteria involving the first four moments of the histograms in the contrast intervals may also be used for selecting the histogram to be normalized.

Optionally, to insure that there is a statistically significant number of samples in the histogram, a check on the total count of samples in the histogram is performed. If the total count is less than some predetermined number, say 1000 samples, the next lower ranked histogram is checked for number of samples. This check is continued until a histogram having at least the required minimum number of samples is chosen.

Turning now to FIG. 10, the steps involved in normalizing the selected histogram will be described. When a histogram has been selected for normalization, the standard normal variate Z for all 80 tone bins in the selected histogram is computed. First however, an average smoothing operation is performed on the selected histogram to remove any spikes. The smoothing is performed on 3 consecutive bins as follows:

$$h_i = \tfrac{1}{3}(h'_{i-1} + h'_i + h'_{i+1}) \quad (8)$$

where $h'_i$ is the count in bin i and
$h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \quad (9)$$

where $$t_j = \sqrt{\ln(1/P_j^2)}$$

$a_0 = 2.30753 \quad b_1 = .99229$ $a_1 = 0.27061 \quad b_2 = .04481$

The cumulative probability $P_j$ for each of the 80 bins is given by $$P_j = \frac{\sum_{i=1}^{j} h_i}{\sum_{i=1}^{80} h_i} \quad (10)$$

where
$h_i$ are the smoothed counts in the ith tone bin, and
j = 1 to 80.

Next, the Z values are linearly interpolated from 80 to 256 values to provide a Z value for each of the 256 possible scanner inputs represented by the 8-bit digital code. Next the 256 Z values are stored in the tone reproduction function lookup table 44 (shown in FIG. 1).

Figure 11:
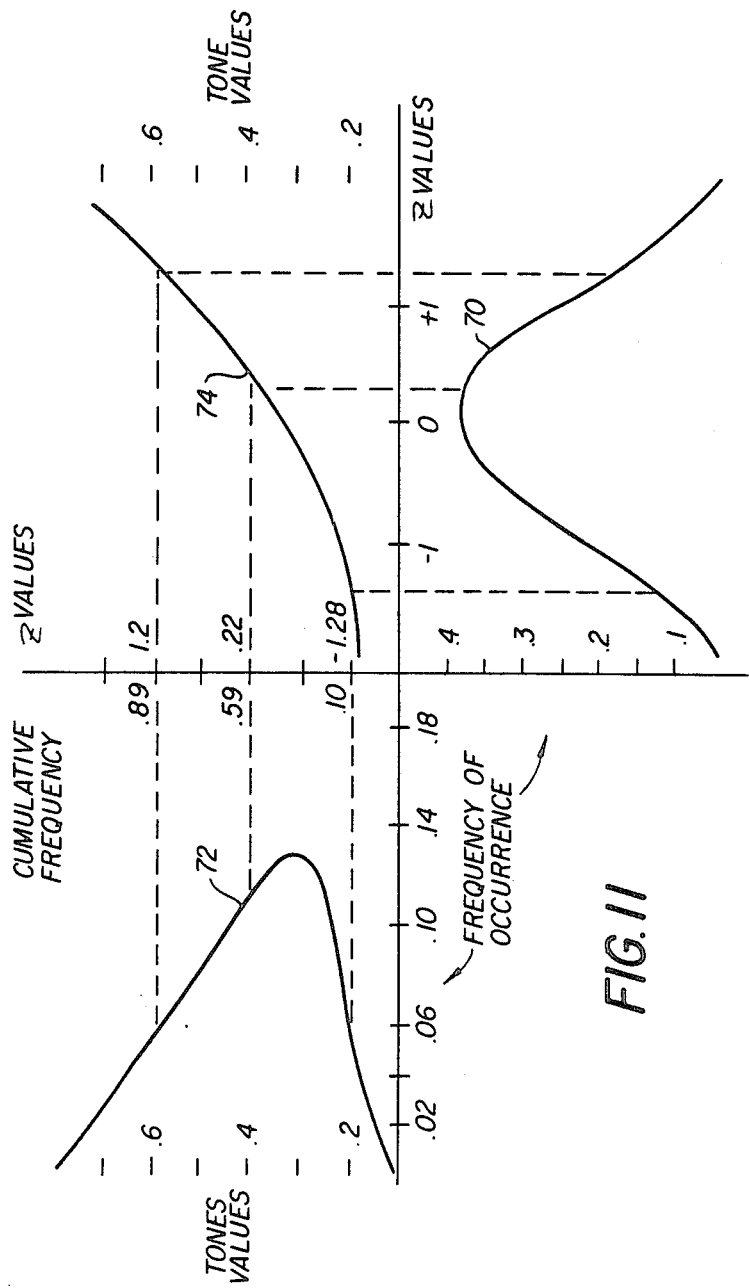
FIG. 11 is a graph illustrating the form of the tone reproduction function generated according to the steps outlined in FIG. 10.

FIG. 11 is a graph showing the form of the tone reproduction function produced according to the present invention. In the lower right quadrant of the graph, a curve labeled 70 represents a standard normal distribution showing the probability of the occurrence of a value plotted against the standard normal variate Z. In the upper left quadrant of the graph, the curve labeled 72 represents the sample of tone values from the informational portion of the image plotted against relative probability of occurrence. The central ordinate of the graph relates the cumulative probability $P_j$ of the tone value sample distribution to Z values according to the relationship defined by equation (9). The tone reproduction curve, labeled 74, maps the Z values on the ordinate to the same Z values on the abcissa. A tone value scale on the far upper right of the diagram, congruent to the tone value scale on the far left, shows how the tone reproduction function relates tone values to Z values.

After the tone reproduction function lookup table 44 is generated, all of the tone values of the image are processed by applying the tone reproduction function to them. At this point, the processed tone values from the image are dimensionless quantities representing the Z values.

To recover the processed image, these dimensionless quantities are given magnitudes with respect to both the original scene and the output medium by multiplying the values with a multiplier that adjusts the contrast of the processed image, and adding a constant term which relates the adjusted Z values to the density of the output medium (see FIG. 10). These factors are incorporated in the output device calibration table 45 shown in FIG. 1. Alternatively, the Z values in the tone reproduction function table may themselves be adjusted by multiplying with the contrast adjustment constant and adding the scaling constant.

Appropriate values for the constant multiplier and the additive constant are determined as follows. The intrinsic contrast of natural scenes can be quantified in terms of the standard deviation of log reflectance of edges in the scene or the density representation of those log reflectances in the photographic image. On the average the approximate relationship between the two is given by:

$$\sigma_D = \overline{G} \cdot \sigma_R \quad (11)$$

where
- $\overline{G}$ = average gradient of the photographic film (relates $\sigma_R$ to some specific reproduction medium contrast)
- $\sigma_R$ = standard deviation of log reflectance based on a large number of original scenes
- $\sigma_D$ = standard deviation of density The typical values for black and white negative photographic films for $\sigma_R$ and $\overline{G}$ are 0.31 and 1.00 respectively, such that $\sigma_D$ is 0.31. Departures from this average contrast must be compensated. A general equation may be stated as:

$$\sigma_z = m \cdot f(\sigma_s) + b \quad (12)$$

where:
- $\sigma_s$ = individual scene standard deviation, from the selected contrast interval
- m and b are system-dependent constants and
- $f(\sigma_s)$ is some function of the sample standard deviation
- $\sigma_z$ = the multiplier applied to the values obtained from the tone reproduction function.

A simple and satisfactory implementation is obtained from:

$$b = \sigma_D (1.0 - m) \quad (13)$$

$$\sigma_z = m \cdot \sigma_s + b \quad (14)$$

where: m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

Note that the adjustment of the contrast in (14) does not affect scenes having the average contrast ($\sigma_D$), nor does it affect the mean value of tone in the scene, since in terms of Z (the standard normal variate) the average value remains 0.0. This is not only a computational convenience in terms of adjusting the contrast, but also in "calibrating" the transformed image with respect to the reproduction medium. For example, if a negative image is to be printed directly onto photographic paper, the log exposure for the desired mean paper density is added to the translated, contrast adjusted values. The complete calculation is given by:

$$\log E_{ZD} - \sigma_z Z_D + \log E_A \quad (15)$$

where:
- $\log E_A$ = log exposure required to obtain the aim paper density
- $Z_D$ = translated Z value for some input density in the original image
- $\log E_{ZD}$ = log exposure for $Z_D$.

INDUSTRIAL APPLICABILITY AND ADVANTAGES

The digital image reproduction method according to the present invention is useful in the graphic arts and photographic printing fields to provide automatic tone-scale and contrast adjustment of digitally processed images. The method is advantageous in that a greater percentage of high quality images are produced automatically, without the need for operator intervention, than by the methods of the prior art.

In the prior art, no method was provided for automatically determining the optimum contrast of the processed image. The present invention provides an automatic method for determining such contrast as a function of the standard deviation of the tone values in the selected contrast bin.

By using a tone reproduction function that transforms the processed image to Z values, the contrast adjustment is easily implemented. This method has the further advantage that the digital image processing is completely independent of the output medium until the last step of adding the constant representing the mean density of the output medium. As a result, digital images may be processed up to this point and stored, for example on magnetic tape. The processed images can then be displayed on different output media with only a minimum of further processing.

I claim:

1. A digital image processing method employing a tone reproduction function generated by normalizing a histogram of a sample of tone values selected from informational portions of a digital image to produce a processed digital image having improved contrast characterized by the steps of computing the standard deviation of the sample of tone values, and of adjusting the contrast of the processed digital image as a function of the standard deviation.

2. The digital image processing method claimed in claim 1, wherein the tone reproduction function relates tone values to Z values (i.e. values of a standard normal variate Z), the tone reproduction function being applied to tone values of the digital image to produce processed Z values, and said step of adjusting contrast comprises multiplying said processed Z values by a contrast adjusting constant which is a function of the standard deviation of the sample of tone values.

3. The digital image processing method claimed in claim 2, wherein said digital image is to be displayed on an output medium with a desired mean density, said method further including the step of adding a constant representing the desiring mean density of the output medium to said processed Z values which have been multiplied by said contrast adjusting constant.

4. The digital image processing method claimed in claim 2, wherein said function of the standard deviation of the sample of tone values is of the form $$\sigma_z = m \cdot \sigma_s + b$$

where:
- $\sigma_z$ is the contrast adjusting contant,
- $\sigma_s$ is the standard deviation of the sample of tone values, and
- m and b are system-dependent constants.

5. The digital image processing method claimed in claim 2, wherein said sample of tone values is selected from a plurality of samples of tone values corresponding to a plurality of contrast intervals on the basis of statistics of the distributions of the tone values in the samples.

6. The digital image processing method claimed in claim 5, wherein the sample of tone values having the most nearly normal distribution of tone values is selected.

7. A digital image processing apparatus for processing tone values of a digital image to produce a processed digital image, comprising:
   means for selecting a sample of tone values from informational portions of the digital image;
   means for normalizing the sample of tone values to produce a tone reproduction function, the tone reproduction function relating tone values to values of a standard normal variate Z (Z values);
   means for applying the tone reproduction function to tone values of the digital image to produce processed Z values;
   means for computing the standard deviation of the sample of tone values; and
   means for adjusting the contrast of the processed digital image comprising means for multiplying said processed Z values by a contrast adjusting constant which is a function of the standard deviation of the sample of tone values.

8. The digital image processing apparatus claimed in claim 7, including means for displaying the processed digital image on an output medium with a desired mean density, and means for adding a constant representing the desired mean density of the output medium to the processed Z values which have been multiplied by said contrast adjusting constant.

9. The digital image processing apparatus claimed in claim 8, wherein said function of the standard deviation of the sample of tone values is of the form $$\sigma_z = m \cdot \sigma_s + b$$

where:
   $\sigma_z$ is the contrast adjusting constant;
   $\sigma_s$ is the standard deviation of the sample of tone values, and
   m and b are system-dependent constants.

10. The digital image processing apparatus claimed in claim 8, wherein said means for selecting a sample of tone values includes means for forming a plurality of histograms of tone values from a corresponding plurality of samples of tone values corresponding to a plurality of contrast intervals, and means for selecting one of the samples of tone values corresponding to one of the contrast intervals on the basis of statistics of the histograms of the samples of tone values.

11. The digital image processing apparatus claimed in claim 10, wherein the sample of tone values having the most nearly normal histogram is selected.

12. A digital image processing method of the type employing a tone reproduction function generated by normalizing a sample of tone values from informational portions of a digital image to produce a processed digital image having improved contrast, said processed digital image to be displayed on an output medium with a desired mean density, characterized by: the tone reproduction function being applied to tone values in the digital image to produce values of a standard normal variate Z (Z values) in the processed digital image, and the method including the steps of: computing the standard deviation of the sample of tone values; adjusting the contrast of the processed digital image by multiplying the Z values by a contrast adjusting constant which is a function of the standard deviation of the sample of tone values, and adding a constant representing the desired mean density of the output medium to the multiplied Z values.

13. A digital image processing method of the type employing a tone reproduction functional generated by normalizing a sample of tone values from informational portions of a digital image to produce a processed digital image having improved contrast, said processed digital image to be displayed on an output medium with a desired means density, characterized by: the sample of tone values being selected from a plurality of samples of tone values corresponding to a plurality of contrast intervals on the basis of statistics of the distributions of the tone values in the samples, and the tone reproduction function being applied to tone values in the digital image to produce values of a standard normal variate Z (Z values) in the processed digital image, and the method including the steps of adjusting the contrast of the processed digital image by multiplying the Z values by a contrast adjusting constant which is a function of the standard deviation of the sample of tone values, the function having the form $$\sigma_z = m \cdot \sigma_s + b$$

where:
   $\sigma_z$ is the contrast adjusting constant,
   $\sigma_s$ is the standard deviation of the sample of tone values, and
   m and b are system-dependent constants; and
including the step of adding a constant representing the desired mean density of the output medium to the multiplied Z values.

14. A digital image processing method of the type employing a tone reproduction function generated by normalizing a sample of tone values from informational portions of a digital image, characterized by: the tone reproduction function being applied to tone values in the digital image to produce values of a standard normal variate Z (Z values) in a processed digital image.

15. The digital image processing method claimed in claim 14, including the steps of: computing the standard deviation of the sample of tone values; multiplying the Z values by a constant which is a function of the standard deviation of the sample of tone values; and adding a constant representing a desired mean density of an output medium to the multiplied Z values.

* * * * *